United States Patent [19]

Saboia De Albuquerque

[11] Patent Number: 5,753,840
[45] Date of Patent: May 19, 1998

[54] SUPPORT FOR THE ARMS AND HANDS OF A USER OF A KEYBOARD, DRAWING, KNITTING INSTRUMENT OR APPARATUS

[76] Inventor: Maria Eulalia Saboia De Albuquerque, 10, rue Joseph-Liouville, 75015 Paris, France

[21] Appl. No.: 823,114

[22] Filed: Mar. 25, 1997

Related U.S. Application Data

[63] Continuation of Ser. No. 256,092, Jul. 19, 1994, abandoned.

[30] Foreign Application Priority Data

Dec. 26, 1991 [FR] France ................... 91 16182

[51] Int. Cl.⁶ ........................................... G09B 15/06
[52] U.S. Cl. ........................ 84/453; 84/469; 248/118; 248/118.5
[58] Field of Search .................. 84/469, 453; 248/118, 248/118.1, 118.3, 118.5; 434/166; 623/65; 401/6, 7, 8; 272/67, 68

[56] References Cited

U.S. PATENT DOCUMENTS

| 591,800 | 10/1897 | Finnblade et al. ................ 84/469 |
| 1,359,928 | 11/1920 | Stafford ............................ 84/469 |
| 4,957,442 | 9/1990 | Prater ............................. 434/166 |

FOREIGN PATENT DOCUMENTS

| 65717 | 6/1963 | Brazil. |
| 0 222 952 | 5/1987 | European Pat. Off.. |
| 0 294 717 | 12/1988 | European Pat. Off.. |
| 20671 | 1/1882 | Germany. |
| 23689 | 8/1883 | Germany. |
| 357260 | 8/1922 | Germany. |
| 377561 | 3/1960 | Switzerland. |

Primary Examiner—Cassandra C. Spyrou
Attorney, Agent, or Firm—Pollock, Vande Sande & Priddy

[57] ABSTRACT

Anatomic rests are provided for a user of a device, including keyboards, drawing devices, and knitting machines. Anatomic rests receive at least the arm, hand, or wrist of the user. The rests are mounted in a manner providing rotation and translation relative to the utilization device. A support extends in front of the utilization device, the support having an upper horizontal surface defining a plane in permanent contact with anatomic rest rotation and translation components. The present system allows for controlled fore and aft movement with respect to the utilization device, as well as lateral movement along a horizontal axis. Rotation is enabled about a second axis so that it is substantially perpendicular to the first.

6 Claims, 9 Drawing Sheets

FIG_5

FIG_6

FIG_7

FIG_8

FIG_12

SUPPORT FOR THE ARMS AND HANDS OF A USER OF A KEYBOARD, DRAWING, KNITTING INSTRUMENT OR APPARATUS

This application is a continuation of U.S. patent application Ser. No. 08/256,092, filed Jul. 19, 1994 now abandoned.

FIELD OF THE INVENTION

The present invention relates to mobile devices that are used as a support and a rest for the arms for performing in a general way lateral and backward-forward movements, of the user of a keyboard instrument of apparatus, such as a piano, organ, computer, typewriter, drawing device, or knitting machine, as well as for maintaining the correct position, in the case of a pianist or organist, while he practices his instrument.

BACKGROUND OF THE INVENTION

Such a device is just a resting point where one places his forearm and his hand in order to perform a very precise and controlled work, for example, playing piano. In this case, it will be easier to assure the muscular relaxation to the highest degree, thus eliminating all superfluous or excessive muscular effort; on the other hand, it enables the separation of the muscular work as much as possible, for a more perfect coordination. This muscular work refers to the different fingers and the different movements performed by the hand, forearm, shoulder, etc.

Therefore, by resting the forearm and the hand on the respective supports, one can, for example, emphasize the finger work, and the work of the finger muscles; after that, we can take away one of the device's support located in the middle of the hand palm, and, in so doing, we can exercise the muscles in charge of hand extension, flexion, etc. Likewise, if we take away the support that is located underneath the wrist, we can articulate the forearm, and so forth.

Therefore, this rest enables the realization of a very precise muscular work for the economy of energy and greater clarity in the learning of finger and muscular work in piano technique, for example, thus controlling the level of tension and relaxation.

We already know a device of this kind, with mobile arms and anatomic rests for the pianist's arms, presented in the Brazilian patent no 65.717 of Jun. 27, 1963, presenting three juxtaposed mobile arms, articulating the arms to the others by means of vertical axis placed at the ends of each arm containing ball-bearings. The articulation among the three arms enable them to pivot and to extend in such a way that by extending them it is possible to move the hands to the extremes of the keyboard, which makes it possible to play all the piano musical works with the arms resting on the anatomical supports of the third arm.

However, in that model the first arm is too long, so, it prevents free movement in certain positions, and when the 3 arms are totally extended for reaching the ends of the clavier, it is difficult to return. On the other hand, the juxtaposed arms have a certain difficulty for maintaining the rigidity level necessary for keeping a constant horizontal level during the movements, mainly towards the ends of the keyboard. Then, for example, they bend towards the ground, and the level of the wrist support goes a few centimeters lower, thus destabilizing the hand which represents a serious handicap.

BRIEF DESCRIPTION OF THE INVENTION

The present invention aims to solve the aforesaid problems in the case of the piano, and also, in a general way, for any instrument or device that demands lateral, circular, backward-forward movement of the arms and hands, by proposing a device capable of maintaining a constant horizontal level. The present invention presents perfect mobility on the aforesaid circular, lateral, forward-backward movements, with the possiblity of following the variations of the elbow level while moving towards the positions which are the most distant from the center, and thus preventing the user from compensating for the eventual variations on the level of the support.

According to an embodiment, the invention consists of a support for the arms and hands of a user of a keyboard instrument or apparatus as well as a knitting, drawing, typing machine or computer, of the type containing concave anatomical rests for each arm and hand, characterized by the fact that each support is set out on a corresponding carriage, mounted and movable by rolling or sliding on a horizontal plane, and intended to be maintained parallel to a keyboard, for example, by supporting means, and characterized by pivoting devices provided between the anatomical rests and the carriage, as well as features for limiting forward and backward and linear movements of the carriage.

Another form of the invention is characterized in that the horizontal plane which limits the backward-forward movement of the carriage is defined by at least two horizontal linear spans of a rail on which the carriage can be moved linearly and characterized in that a support-plate for the anatomical rests is pivot mounted on the carriage for horizontal movement in a plane parallel to the carriage and which can be directed and moved forwards and backwards.

A first embodiment of the present invention is a support for the arms and hands, constituted of anatomic rests for each forearm and each hand, mounted on movable and pivoting supports, each support consisting of a carriage slide-mounted on a rail, each carriage receiving a pivot mounted support which can be directed around a vertical axis and on which is mounted a sliding block that is movable forming a forward-backward movement, and to which are attached the anatomical rests. Each anatomical rest of the forearm is linked to the corresponding support by a flexible blade in the vertical direction, and the corresponding support contains means for adjusting the position of the blade to adapt it according to the morphology of the user; the adjustable support is pivot-mounted on the carriage by means of a turning panel maintained between two fixed parts integrated into the carriage by two layers of ball bearings. The sliding block adjustable support forming the forward and backward movement systems is roller-mounted over its length and supported on ball-bearings paths in a U-shaped part integrated into the turning panel.

According to the invention and a second manner of embodiment, the horizontal plane limiting forward and backward movement of the carriage is defined by at least two horizontal linear spans of a rail on which the carriage can be moved linearly and characterized in that the support plate for anatomical rests is pivot mounted on the carriage for horizontal movement in a plane parallel to the carriage and which can be directed and moved forwards and backwards.

And according to another characteristic, a pivoting arm or rod that supports the support plate is linked to this last one by means of a joint located at the back part of the support plate.

In this case, the joint between the arm or rod and the carriage is located at one end of the carriage, at the right side for the right arm support and left side for the left arm support.

According to another characteristic of this embodiment, the rail support devices are of such a length in relation to the instrument attachment part, that the distance between the front of the keyboard and the axis of the rail is less than the sum, firstly, of the distance between the wrist support and the joint of the adjustable support plate, and secondly, the sum of the distance that separates both joints, the one for the adjustable plate, and the other for the arm or rod, in such a way that the support plate, in lateral and forward-backward movements, is maintained more or less perpendicular to the keyboard and the pivoting arm moves in an angle in relation to the rail axis, limited to around 30°, even in the extreme positions of the keyboard.

According to another embodiment, the carriage is supported on the plane by at least 3 support points over at least one horizontal side of the plane to enable both side and forward-backward movements, in that front-back and side stops to limit forward and backward travel of the carriage are provided on at least one to the carriage/support plane assembly.

In this case, according to other characteristics, the support points comprise balls supported themselves by a circular ball bearing in relation to the carriage so as to allow for pivot movements apart from side and forward-backward movements.

On the other hand, the anatomical rests are located on either side of the carriage forming a support in such a way that the center of gravity of the arm resting on the anatomical rests is located within the support polygon defined by the spaced positions of the ball-bearing bases.

According to a variation of this form of embodiment, the carriage may have two horizontal superposed and parallel supporting sides, in which case it presents linking parts on at least one side between the upper and the lower spaced branches of the carriage, opposite a distance corresponding to at least the forward and backward movement of the carriage on the plane.

In all these variations the anatomic rests for the wrist and hand are attached to a L-shaped rod which is pivot-mounted directly on the carriage.

In relation to the systems for holding the plane or rail in a parallel position in front of the keyboard or instrument, a first system contains two telescopic adjustable legs of the screw type, each of which is constituted of a vertical rod along which an arm can be vertically slipped supporting the rail or plane, held in an adjustable position by a ring with a butterfly nut, and also containing at least one rubber buffer placed at the upper part of the leg to protect the wooden parts on which it is supported; a square recess is placed on the front side of the upper end of the arm to receive the said rail.

The second system for holding the rail or plane in a parallel position in front of the keyboard comprises an arm which articulates around a vertical part attached to a plate which is intended to be attached under the instrument or device at the ends and a retaining element such as, for example, a hook-shaped rod adjustable around one end of the plate and on a small projection placed, on the other end, so that this arm may be placed in a folded down position below the instrument or device by the same system if the rod is articulated backwards to maintain the arm in this folded away position.

The third system to maintain the plane or rail in a parallel position in front of the instrument or device contains at least one leg on each side, on each of which is placed a lateral bar supporting the plane or rail at the end and adjustable and fitted out with rubber buffers on the inner sides, intended to be tightened against the lateral edges of the instrument by at least one threaded rod which connects them and which contains a bolt at one end, e.g., a butterfly nut to tighten the whole.

According to a variation, the support is independent and constituted of 4 legs like a table, directly supporting the plane or the rail.

For the purpose of promoting an understanding of the principles of the invention, reference will now be made to the embodiments illustrated in the drawings. Nevertheless it will be understood that no limitation of the scope of the invention is thereby intended, such alterations and further modifications in the illustrated devices, and such further applications of the principles of the invention as illustrated therein being contemplated as would normally occur to one skilled in the art to which the invention relates.

DETAILED DESCRIPTION OF THE INVENTION

Figure 1:
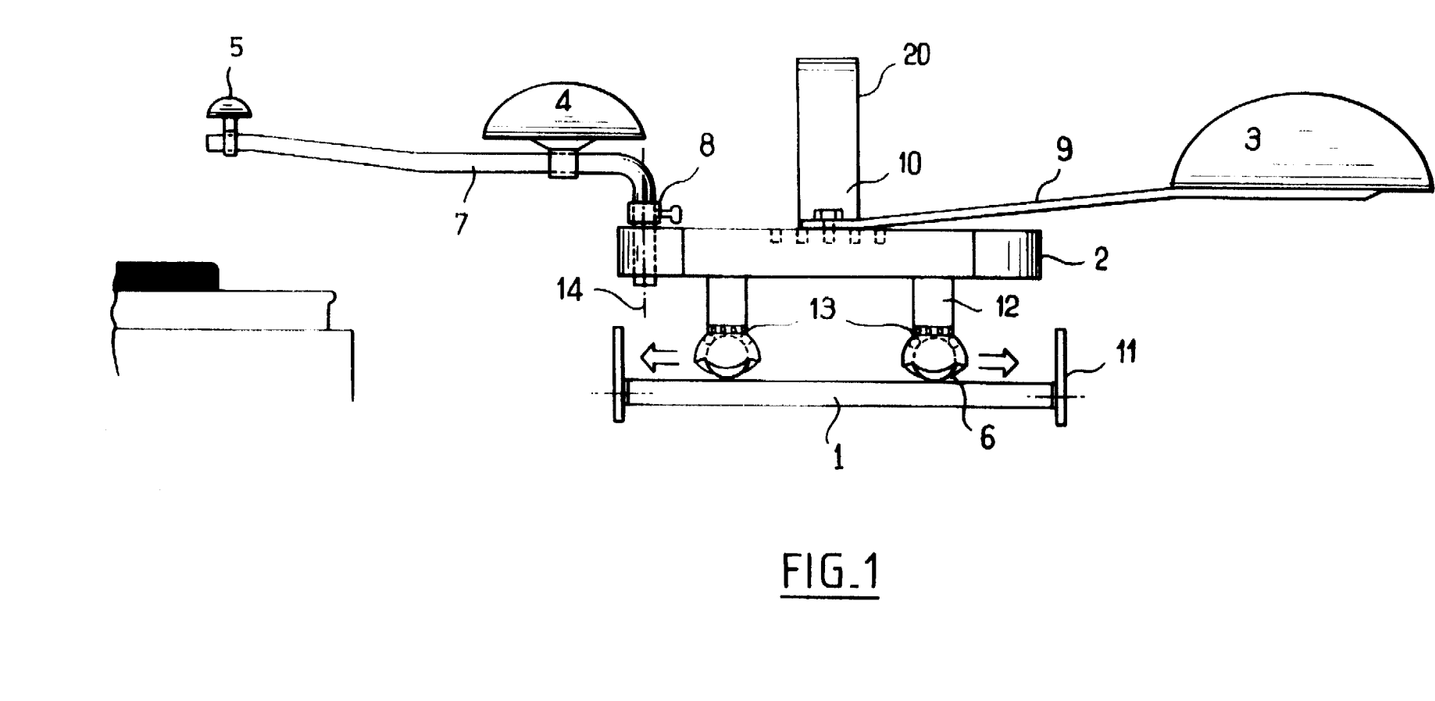
FIGS. 1 and 2 represent the device constituted of a carriage (2) forming a support for the anatomic arm and hand rests, moving directly in all directions on a horizontal plane (1).

FIG. 1 shows a cross-sectional view of one embodiment of this invention. We see the carriage (2) on the plane (1) supported by the ball-bearings (6), the flexible blade (9) to which is fixed the anatomic rest (3) of the forearm as well as the position adjusting means (10) of said blade; the L-shaped rod (7) pivot mounted by its own axis (14) on the carriage (2) with a butterfly nut (8) to adjust the height of said L-shaped rod (7), on which are mounted the anatomic rests for the wrist (4) and for the hand (5). The plane (1) with front-back and side stops (11) to limit the movement of carriage (2) and to prevent it from running out of said plane (1).

Figure 2:
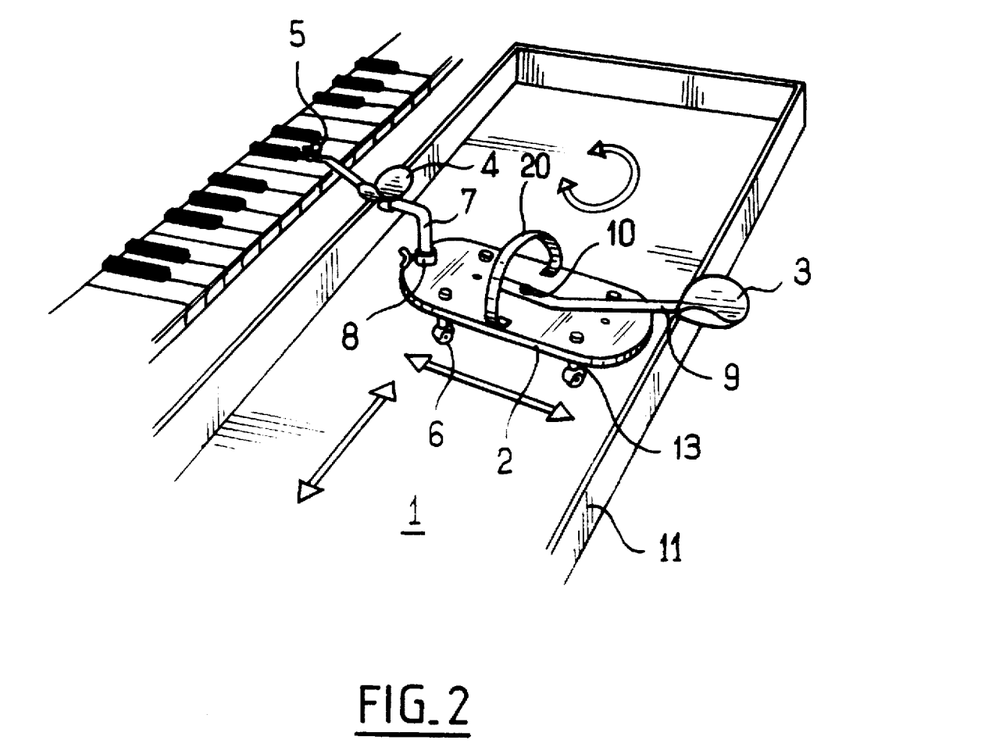

FIG. 2 is a perspective view of the apparatus corresponding to FIG. 1, with the carriage (2) on the plane (1) supported by the balls (6), the flexible blade (9) which holds the anatomic rest for the forearm (3) mounted on the carriage (2); the means for adjusting the position of said blade (10), the L-shaped rod (7) pivot mounted in its own axis (14) on the front part of the carriage (2). Here the carriage (2) contains on each side means for holding the forearms (20) for example in the form of a fastening belt to be attached around the forearm in order to maintain it on the carriage (2) during the linear sideways movements.

Figure 3:
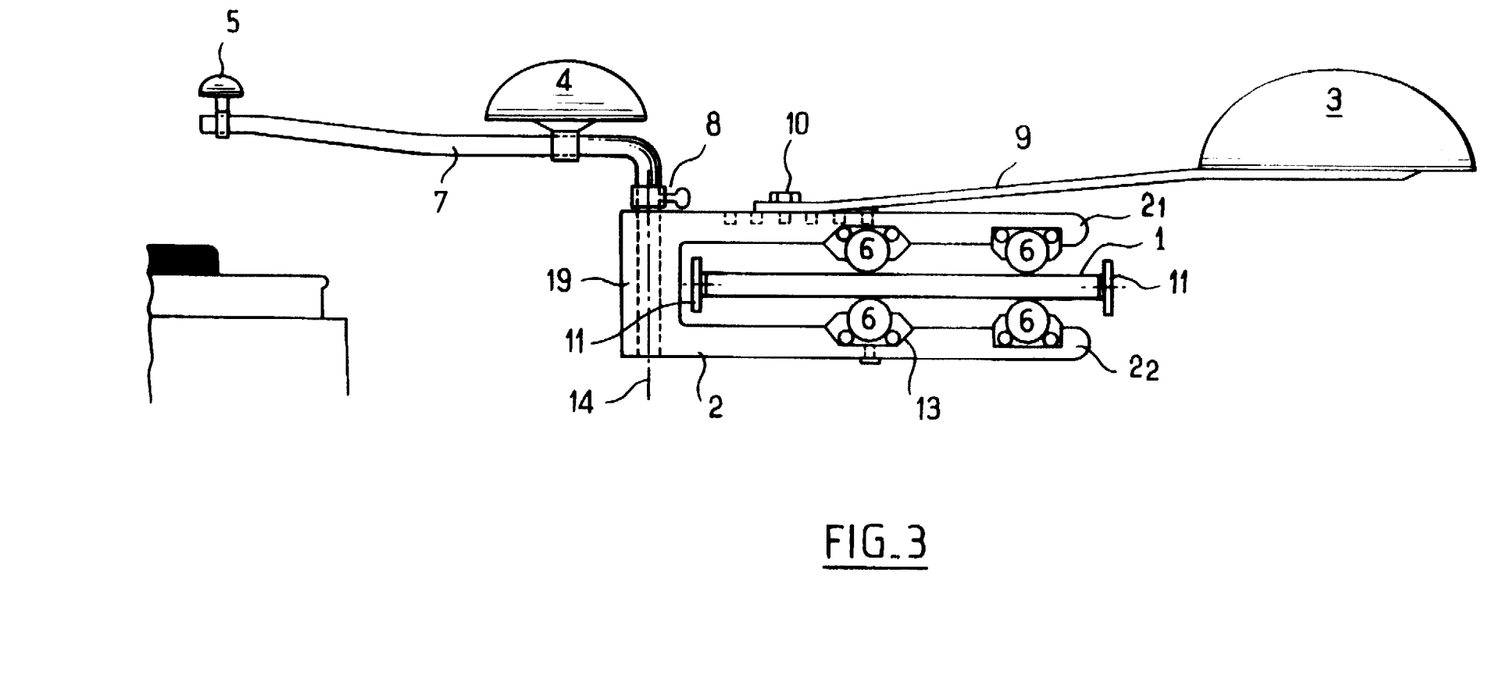
FIG. 3 represents, in relation to FIGS. 1 and 2, the case in which the carriage (2) takes in the horizontal moving plane (1) with two horizontal and parallel supporting sides (2.1) (2.2), and with linking parts (19) on at least one side between the upper (2.1) and the lower (2.2) branches.

FIG. 3 is a cross-sectional view of the apparatus showing the carriage (2) taking in the horizontal plane (1) with its two horizontal superposed and parallel branches (2.1) superior and (2.2) inferior, supported by the balls (6); the linking part (19) of the two branches on the front side of the carriage (2) spaced from the balls (6) face to face.

Figure 4:
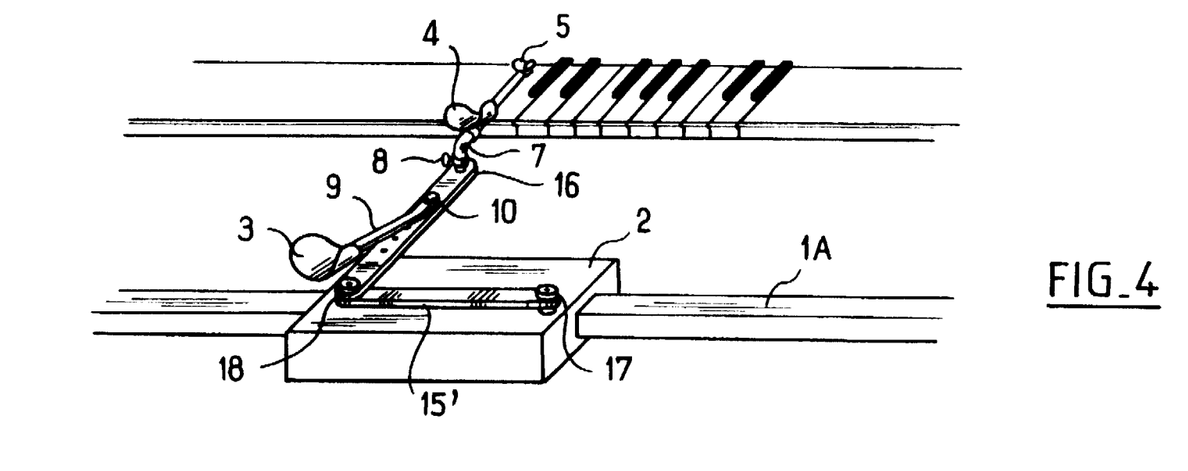
FIGS. 4a, 4, 5, 6, 7, and 8 to represent other variations where the horizontal plane is defined as a rail (1A) on which the carriage (2) can be moved linearly, and supports, by means of a joint and sliding block (FIGS. 6, 7, 8) a support plate (16) of the anatomic arm and hand rests (3) (4) (5).

FIG. 4 is a view on perspective of a manner of embodiment of the apparatus showing the correct utilisation position of this device where we can see the horizontal plane in the form of a rail (1A) on which is slide-mounted on the carriage (2) that receives the pivot-mounted rod (15') pivoting on a vertical joint (17) located on the carriage (2), the rod (15') on the parallel position of utilisation during the horizontal movement of the carriage (2). On the opposite side of this joint (17) is equally pivot-mounted a support plate (16) of the anatomical rests (3) (4) (5) that can be directed by pivoting on a vertical axis joint (18) integrated to the rod (15'); the joints (17) (18) enable the forward-backward movement of the support-plate (16).

Figure 4A:
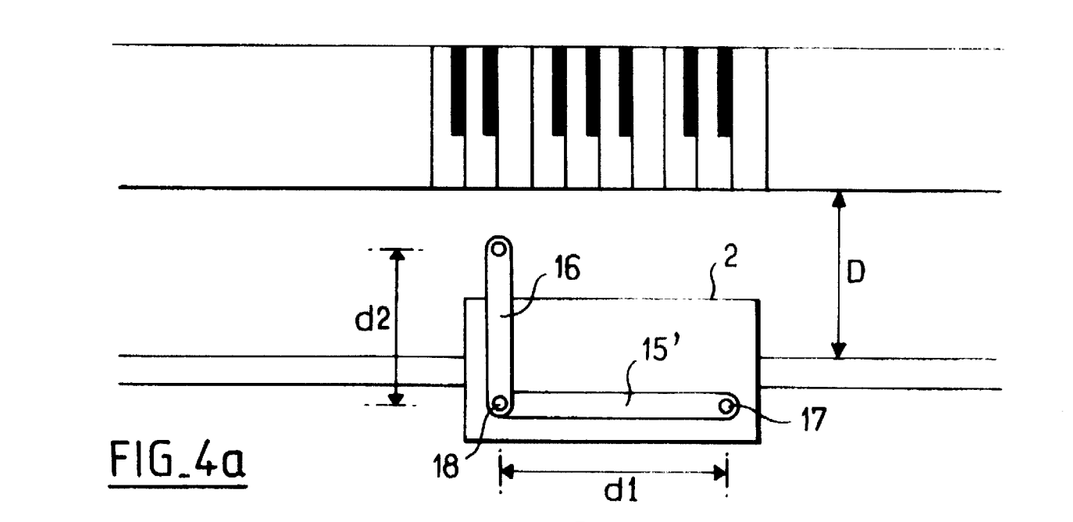

FIG. 4A is a top view of this apparatus presenting the details of the distances, on one hand d1 between joints (17) (18) on which rod (15') is articulated, on the other hand d2 between the anatomical wrist rest (4) and joint (18). The sum of these distances d1+d2 must be superior to D, thus showing that the support-plate (16) is maintained relatively perpendicular to the keyboard, for example, and rod (15') moves in an angle in relation to the rail axis (1A) limited to around 30°, even in the extreme positions of the keyboard.

Figure 5:
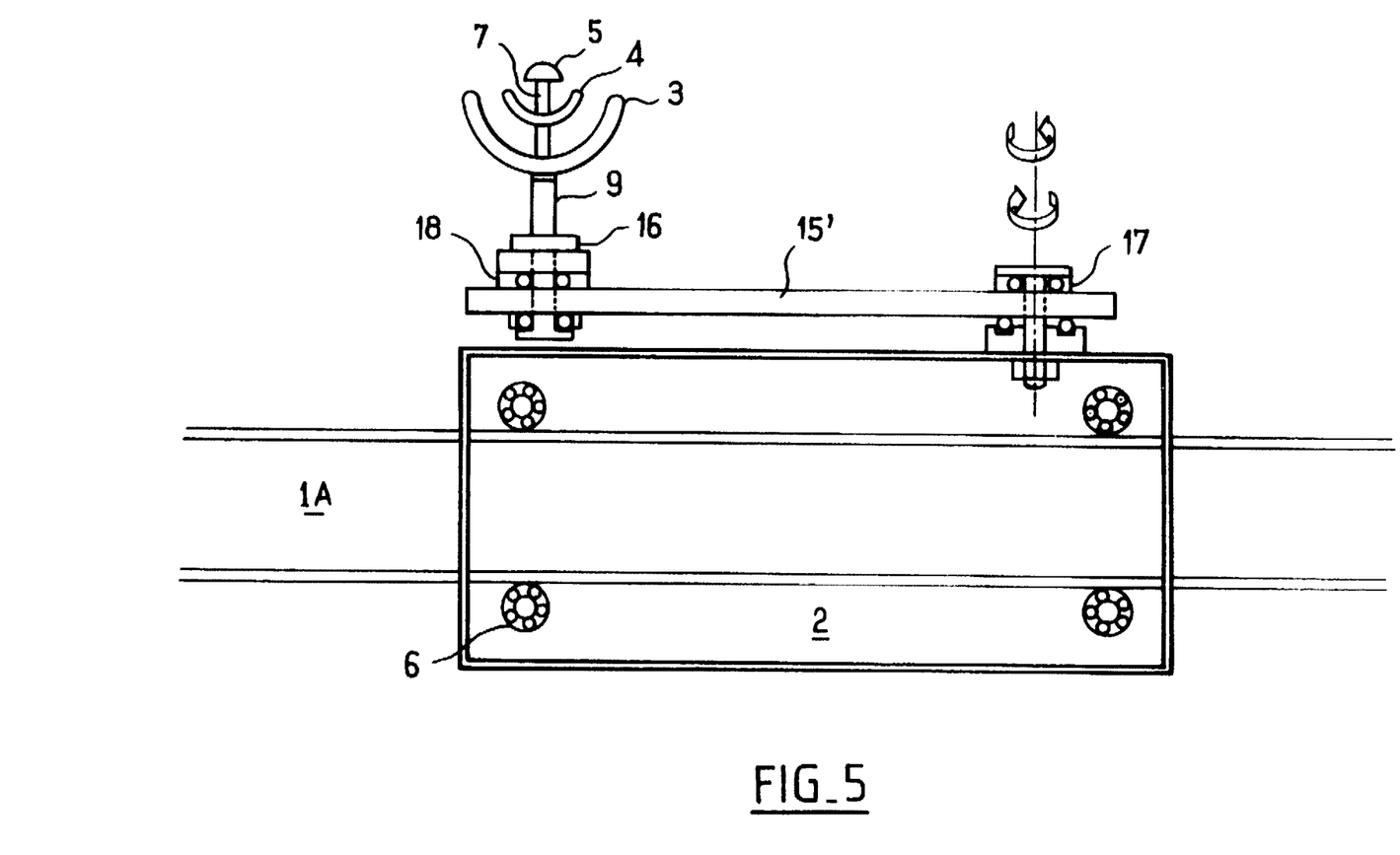

FIG. 5 is a longitudinal section view of the device in the vertical plane of the rail according to FIG. 4, showing the rail (1A) on which the carriage (2) slides supported by balls (6), the arm or rod (15') mounted on the joint (17) located on one end of the carriage (2), the support-plate (16) that carries the anatomical rests (3) (4) (5) and also the joint (18) that enables support-plate (16) to pivot and to do forward-backward movements.

Figure 6:
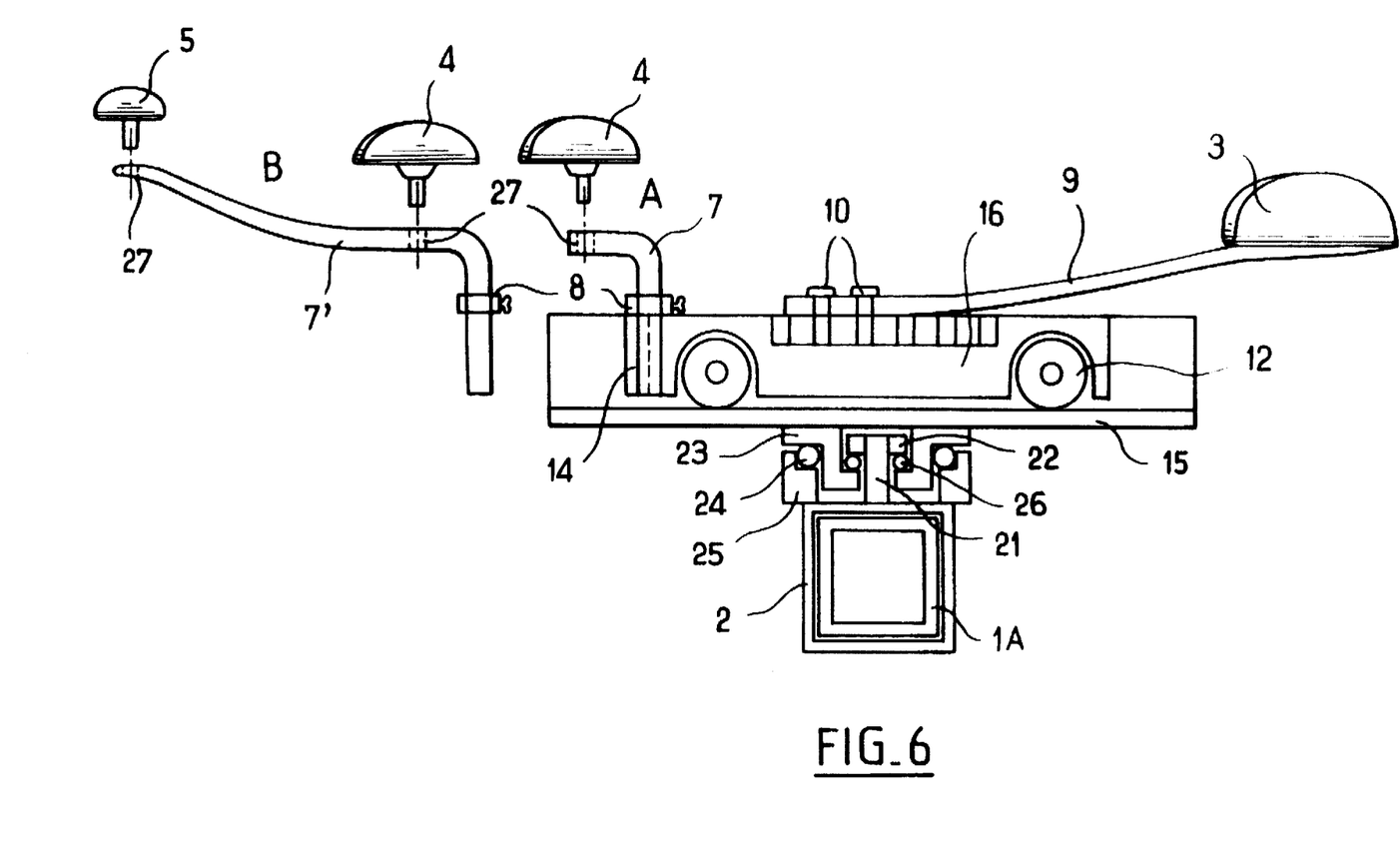

FIG. 6 is a side view of the apparatus showing the rail (1A), the carriage (2), the horizontal round joint presenting two parts (23) (25), the screw (21) and the nut (22) that tighten the two parts (23) (25), the ball-bearings (24) and (26), the U-shaped part (15) with the sliding-block support (16) that glides on ball-bearings (12) and on top of which is fixed the flexible blade (9) attached and adjustable by means of screw (10), the flexible blade extending towards the back of the carriage (2) and supporting the anatomical arm rest (3); on the front part of the sliding-block (16) we see the interchangeable L-shaped rods (7) (7'), the holes (27) (27'), the wrist rest (4) the hand rest (5), butterfly nuts (8) that serve to adjust the f-height of L-shaped rods (7) (7').

Figure 7:
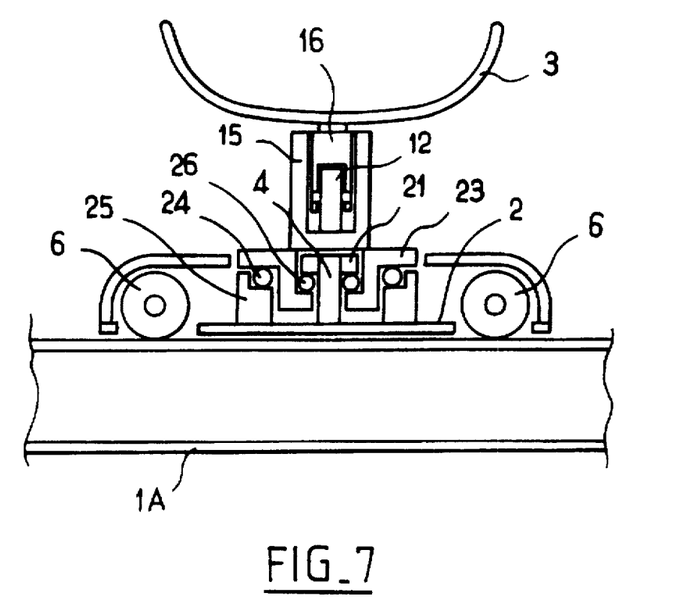

FIG. 7 is a back view of the device related to FIG. 6 showing the carriage (2) sliding by means of running ball-bearing wheels (6) on the rail (1A), and a cross-sectional view of the U-shaped part (15) that holds and guides the sliding-block (16) and the anatomical arm rest (3).

Figure 8:
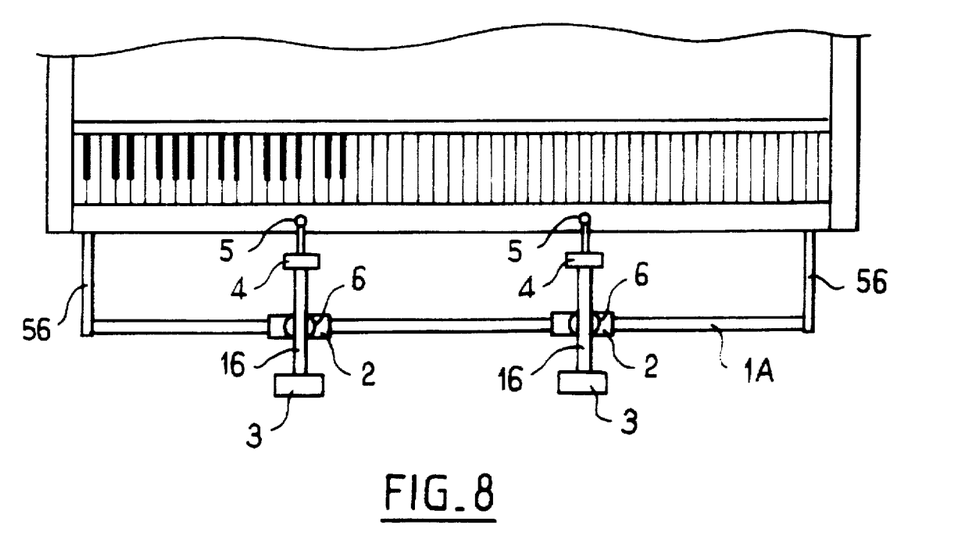

FIG. 8 is a top view of this apparatus attached to a piano. On the rail (1A) we see the carriage (2), the round-parts (23) the sliding-block (16) on which are mounted the 3 anatomical rests (3) (4) (5) for the arms and hands.

Figures 9, 10, 11:
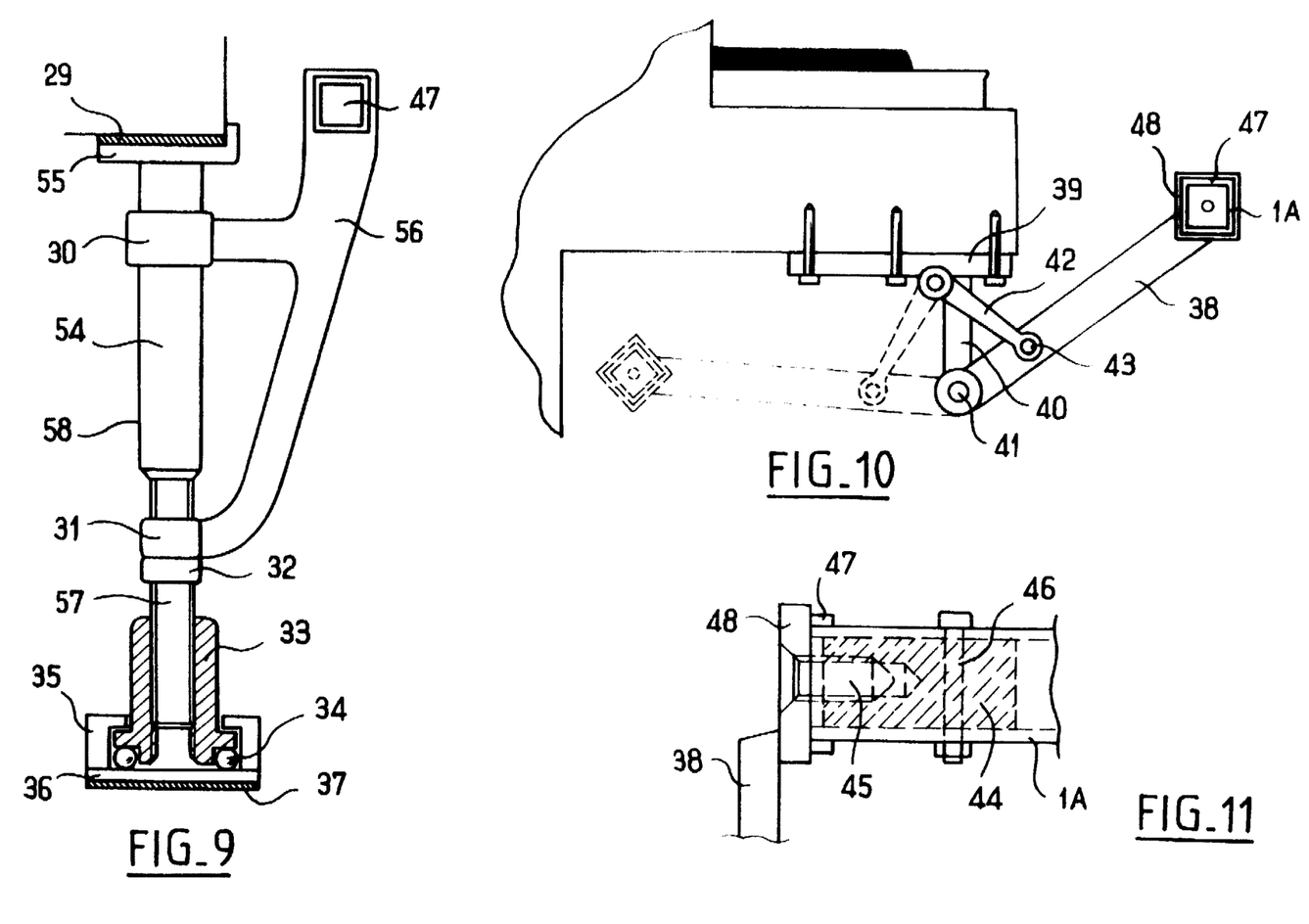
FIG. 9 represents a system of maintenance of the apparatus on a parallel position in front of the instrument or device.
FIG. 10 shows a system of attachment to a keyboard.
FIG. 11 shows a system for assembly.

FIG. 9 is a side view of a system for holding the rail (1A), intended to be placed underneath the piano keyboard for example, comprising two telescopic adjustable legs (58) constituted by the following parts: a square rod for example and vertical (54) around which can slip a ring (30) which is fixed to an arm (56) which is the support of rail (1A) the rod (54) which is intended to be threaded inside so as to receive the threaded rod (57) in the form of a screw around which slides a ring (31) which is also attached to the lower part of arm (56). A nut (32) holds the ring (31) thus adjusting the height of the rail (1A).

The lower part of screw (57) penetrates in a base which has the form of a rod (33) and turns around screw (57) in order to raise the two rods of the telescopic legs, thus producing the necessary pressure for a solid fixation of leg (58) underneath a piano. We also see the ball-bearings (34) that are intended to facilitate the rotation of rod (33), which are inserted between this rod and the bottom plate (36) of the base. The bottom plate contains a rubber buffer (37). A cross-section of the retaining flange (35) maintains rod (33) in its inner place. On the upper part of rod (54) is placed a support plate (55) covered with a rubber buffer (29).

FIG. 10 shows a system of attachment of the rail (1A) to, for example, a piano. Two plates (39) are fixed underneath and at the ends of the keyboard. To each one of these plates is attached a vertical part (40) having a joint (41) to which is attached a pivoting arm (38) functioning as a hinge. At the other end of arm (38) is an assembling system to which can be attached the rail (1A) to be held in parallel position in front of the keyboard. The rail (1A) can be articulated backwards underneath a piano and remain on this position by means of the same system with the help of rod (42) and cylinder (43) if the arms (38) is articulated backwards underneath the keyboard.

FIG. 11 shows a system for assembling the pivoting arm (38) to the rail (1A). The recess (47) is seen in which is encased the rail (1A), a small bar (44) that can be rectangular for example and penetrates inside each end of the rail (1A), and an attachment screw (45) which attaches the rail (1A) to the supporting plate (48) as well as a transversal screw (46) that keeps the bar (44) in place.

Figure 12:
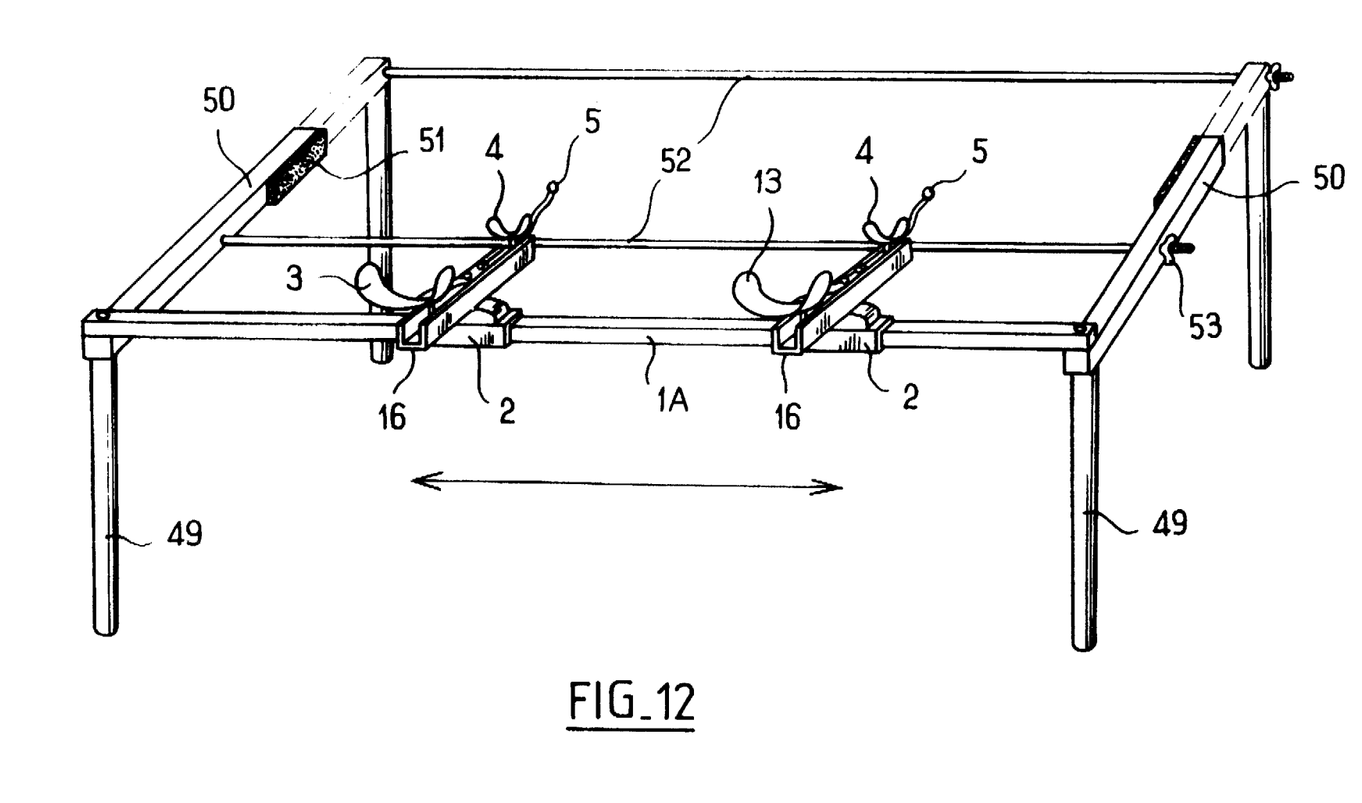
FIG. 12 represents a maintenance system.

FIG. 12 represents a maintenance system of the plane (1) or the rail (1A) in parallel position in front of an instrument or device containing at least two legs (49) on each of which is placed a lateral bar (53) supporting the plane (1) or rail (1A), such bars being tightened against the lateral edges of the instrument by at least one threaded rod (52) which connects them and which contains a bolt at one end, e.g., a butterfly nut (53), to tighten the whole. The lateral bars (53) are fitted out with rubber buffers (51) on the inner sides, intended to protect the wood of the instrument against which the bars (53) are pressed.

Therefore in reference to these drawings and according to FIGS. 1 and 2 the invention is a support for the arms and hands of someone using, for example, a keyboard, drawing, or knitting instrument or device of the type containing anatomical rests for each arm and hand, characterized in that each support is set out on a corresponding carriage (2), mounted and movable by rolling or sliding on a horizontal rectangular plane (1) surrounded by protecting stops at each side in order to prevent the carriage (2) from sliding out of the plane (1); and the carriage (2) is placed directly on a plane (1) supported by at least four points (6), or even more if necessary, on the superior horizontal face of the plane (1) to enable linear and forward-backward movements of the arm and hand rests (3) (4) (5); and side stops (11) that are provided at the boards of the plane (1) to limit the linear and forward-backward movements of the carriage (2). A flexible blade (9) enables the elbow to adjust its position on the extremes of the keyboard, the flexible blade (9) mounted on the back side of the carriage (2) directly and which can be adjusted to the morphology of the user by means of a series of holes and two screws (10) that attach the blade (9) to the sliding-block (16); two interchangeable L-shaped rods (7) (7') are pivot mounted on the axis (14) on the front part of the carriage (2), and contain means for adjusting their height by a butterfly nut (8) integrated to a ring around the said L-shaped rods (7) (7').

Here, the supporting points of the carriage (2) are the balls (6) that support themselves against a circular ball-bearing (13) in relation to the carriage (2), so as to allow for pivot movements of the supporting points besides the lateral and back-forward movements.

According to a variation of this embodiment corresponding to FIG. 3, the carriage (2) is supported on the plane (1) by at least 3 points consisting of balls (6) on the two horizontal surfaces of the plane (1), the carriage (2) takes in at least partially the horizontal movement plane (1) and its superior (2.1) and inferior (2.2) spaced branches are linked to each other by at least one linking part (19) located on the front part of the said carriage (2).

According to the embodiment illustrated on FIGS. 4 and 5, the carriage (2) is sliding mounted on a rail (1A) moving linearly and supported by ball-bearings (6), for example, on each surface of the said rail (1A); on the carriage (2) is pivot mounted and movable a support plate (16) for the anatomic rests (3) (4) (5) for horizontal movement in a plane parallel to the carriage (2); this support-plate (16) can also be directed and moved forwards and backwards by means of an arm or rod (15') pivoting on one hand on the articulation of vertical axis (17) located on the carriage (2) and on the other hand on another articulation of vertical axis (18) integrated to the support plate (16).

The articulation between the arm or rod (15') and the carriage (2) is located at one end of the carriage, at the right side for the right arm support, and the left side for the left arm support. The joints (17) (18) enable the forward-backward movement of support-plate (16). The arm or rod (15') is movable parallel to the carriage (2) and, during the back-forward movements, it remains more or less on this position and moves in relation to the rail axis (1A) on an angle limited to around 30°, even in the extreme positions of the keyboard for example.

It is important to acknowledge the difference between the functioning of the present system and the one proposed in Brazilian patent no 65.717 of the Jun. 27th, 1963, already known. In that system, the absence of a horizontal plane or rail was compensated by the extension or elongation of the three arms along the keyboard, in order to perform the linear movements. The three pivoting mounted arms were considerably extended in order to enable the hand to reach the extreme positions of the keyboard, and were blocked on their return to a central position.

In the system proposed in this invention, the pivoting arm (15') has almost exclusively the role of an element in a forward-backward moving system, and its position mostly parallel to the carriage (2) is limited and quite constant, which eliminates friction because the arm (15') and the support-plate (16) never extends towards the extreme positions of the keyboard.

According to another embodiment, as shown in FIGS. 6, 7 and 8, the present device consists of a rail (1A) preferably square, that is, for example placed in front of a keyboard supporting two carriages (2) that can glide or slide along the rail (1). Each carriage consists of a square support mounted around the rail (1A), supporting itself on ball-bearing wheels (6). An adjustable support (16) is pivot mounted on carriage (2) by means of a round part (25) that contains the balls (26) and that receives another pivoting part (23); a screw (21) and a nut (22) maintain the round part (23) in the middle of the carriage (2) and tightens them together.

In a U-shaped part (15) integrated into the turning panel (23) is a roller mounted over its length a sliding-block adjustable support (16) forming the forward-backward movement system. The balls (26) serve the purpose of avoiding friction between the nut (21) and round part (23).

On one end of the sliding block (16) is fixed the flexible blade (9) by means of two screws (10). This blade receives the anatomic arm rest (3) on the other end. On the front side of this sliding block (16) there is a hole (14) where the L-shaped rods (7) (7') are pivot-mounted, and hold the wrist and hand rests (4) (5). When we want to rest only the wrist, we place inside the hole (14) the L-shaped rod (7) in which edge there is another hole (27) for a smaller anatomic wrist rest (4); if we also want to rest the hand, we choose the other longer rod (7') on which there are 2 holes (27) (27'), the first one (27) for the wrist rest (4) and the second one (27') for the smallest anatomic rest in the shape of a ball (5) for the hand palm. The L-shaped rods (7) (7') contain a ring with a butterfly nut (8) for adjusting the height of the wrist and the hand. The small anatomic rests (4) (5) and the elements (7) (7') are pivoting mounted.

In order to hold the rail in front of the keyboard or apparatus, different possibilities are presented in this specification. The first one, as illustrated in FIG. 9, consists of two telescopic legs fixed underneath the keyboard of the piano. Each leg is a vertical rod (54) preferably square, surrounded by a ring (30) that can slip vertically along this rod (54). The ring (30) is attached to the arm (58) which supports the rail (1A); the rod (54) is prolonged by another round rod in the form of a screw (57) around which can glide the ring (31) that is also attached to the arm (56); a nut (32) is intended to adjust the height of rail (1A); at the lowest end, the rod (57) penetrates in a base on the shape of a rod (33) which serves the purpose of elongating the two rods (54) and (57) for the solid fixation of the leg underneath the piano. The rotation of rod (33) is helped by the balls (34) located between this rod and plate (36) which has a rubber buffer (37) at the bottom. The flange (35) surrounds rod (33) in order to maintain it in place. On the upper end of rod (54) there is another plate (55) covered with a rubber buffer (29) for the protection of the piano wood for example.

The second system for holding the rail in front of the piano presents the following characteristics: two plates (39) fixed underneath and at the ends of the keyboard. To each one is attached a vertical part (40) having a joint (41) at the other end, to which is attached a pivoting arm (38); this arm presents, at the other end, a system for assembling the rail. A rod (42) holds onto a small projection (43) located on arm (38) and holds the rail in front of the keyboard. The rail (1A) can be placed in a folded down position and maintained in this position by means of the same system, if rod (42) is articulated backwards. At the end of arm (38) there is a square plate (48) that presents a recess (47) in which is encased the rail (1A); a small rectangular bar (44) in order to tighten the rail (1A) against arm (38). A transversal screw (46) holds the bar (44).

The third system for holding the plane (1) or the rail (1A) in parallel position in front of the instrument or device as illustrated in FIG. 12 and consists of two lateral bars (50) placed on each side of the instrument supported, for example, supported by at least two legs (49) and attached to each other by at least one threaded rod (52), having a bolt at one end, e.g., a butterfly nut (53) to tighten the whole. Two rubber buffers (51) are fitted between the lateral bars (50) and the wood of the instrument. The plane (1) or the rail (1A) are fixed on the two lateral bars (50) in front of the keyboard or device.

According to another embodiment of the present invention, the means of supporting are independent and constituted of 4 legs like a table supporting directly the plane (1) or the rail (1A)

The claims defining the invention are as follows:

1. An assisting apparatus for a user of one of a keyboard instrument, a keyboard device, a drawing device and a knitting device, comprising:

anatomic rests for receiving thereon at least one of an arm, a hand and a wrist of said user, anatomic rests rotation and translation moving means which are connected to said anatomic rests, support means extending in front of one of said keyboard instrument, said keyboard device, said drawing device and said knitting device, said support means having an upper horizontal surface defining a plane in permanent contact with said anatomic rests rotation and translation moving means, while said user uses one of said keyboard instrument, keyboard device, drawing device and knitting device, for allowing the anatomic rests to have, a controlled fore-and-aft movement with respect to one of said keyboard instrument, keyboard device, drawing device and knitting device, a controlled lateral movement along a first substantially horizontal axis, transversally to said controlled fore-and-aft movement, and a controlled rotation movement around a second axis substantially perpendicular to said first axis;

said anatomic rests rotation and translation moving means having fore and aft moving means for executing fore and aft movement of the anatomic rests with respect to the support means.

2. An apparatus according to claim 1, wherein:

said second axis is a substantially vertical axis, said support means comprise a rail having a substantially rectangular cross-section and extending along said first axis, and said anatomic rests rotation and translation moving means comprise:

a carriage having a substantially rectangular cross section for being slidably disposed in permanent contact with said rail, for sliding along said first axis thereof in front of one of said keyboard instrument, said keyboard device, said drawing device, and said knitting device, while said user uses one of said keyboard instrument, said keyboard device, said drawing device and said knitting device, at least one plate for carrying said anatomic rests, and rotation and translation connecting means for connecting said plate to said carriage, while allowing said plate to have said rotation movement about said second axis and said fore-and-aft movement.

3. An assisting apparatus for users of keyboard, drawing, and knitting utilization devices, comprising:

anatomic rests for individually receiving an arm, hand, or wrist of the user;

means connected to the rests for enabling rotation and translation of the rests;

support means extending in front of one of said utilization devices;

the support means having an upper horizontal surface defining a plane in permanent contact with the means connected to the rests for enabling rotation and translation of the rests, during operation of the utilization device by a user for enabling the anatomic rests to execute (a) controlled forward and rearward movement with respect to the utilization device;

(b) controlled lateral movement along a first horizontal axis, transverse to the controlled forward and rearward movement; and (c) controlled rotation around a second axis perpendicular to the forward and rearward movement;

the means connected to the rests for enabling rotation and translation of the rests having fore and aft moving means for executing fore and aft movement of the anatomic rests with respect to the support means.

4. The assisting apparatus set forth in claim 3 wherein the means for enabling rotation and translation of the rest further includes a carriage to which is fixed the fore and aft moving means, the carriage having:

(a) a support that includes a substantially parallelogram cross section to be supported on the upper surface of the support means for enabling lateral movement;

(b) pivoting mesas connected to the support means for enabling rotation, the pivoting means supporting a U-shaped tray; and (c) a sliding block disposed on the U-shaped tray for enabling controlled forward and rearward movement, the sliding block mounting the anatomic rests.

5. The assisting apparatus of claim 3 wherein:

the second axis is vertical;

the support means is a rail having a parallelogram cross section and extending along the first axis;

the means connected to the rests for enabling rotation and translation of the anatomic rests include a carriage slidably mounted to the rail for motion along the first axis, in front of the utilization, device during operation thereof;

(b) at least one plate for mounting the anatomic rests; and (c) rotation and translation connecting means for connecting the plate to the carriage, while allowing the plate to execute rotation about the second axis and forward and rearward movement.

6. The assisting apparatus of claim 3 wherein:

the anatomic rests includes a user forearm rest;

a flexible blade for connecting the forearm rest to the means for rotation and translation of the anatomic rests; and means for adjusting the connection of the flexible blade to the means for enabling rotation and translation of the rests.

* * * * *